United States Patent
Conrad

(10) Patent No.: US 8,567,005 B2
(45) Date of Patent: Oct. 29, 2013

(54) CONSTRUCTION TECHNIQUE FOR A DOMESTIC APPLIANCE SUCH AS A SURFACE CLEANING APPARATUS

(75) Inventor: Wayne Ernest Conrad, Hampton (CA)

(73) Assignee: G.B.D. Corp., Nassau (BS)

( * ) Notice: Subject to any disclaimer, the term of this patent is extended or adjusted under 35 U.S.C. 154(b) by 380 days.

(21) Appl. No.: 12/846,893

(22) Filed: Jul. 30, 2010

(65) Prior Publication Data

US 2011/0023257 A1 Feb. 3, 2011

(30) Foreign Application Priority Data

Jul. 30, 2009 (CA) .................................... 2674410

(51) Int. Cl.
*A47L 5/00* (2006.01)
(52) U.S. Cl.
USPC .............................................. 15/334; 15/335
(58) Field of Classification Search
USPC .................................................... 15/334, 335
IPC .......................................................... A47L 5/00
See application file for complete search history.

(56) References Cited

U.S. PATENT DOCUMENTS

| | | | | |
|---|---|---|---|---|
| 4,079,965 A | * | 3/1978 | Moughty et al. | 285/7 |
| 4,669,755 A | * | 6/1987 | Harris et al. | 285/7 |
| 6,006,399 A | * | 12/1999 | Massaro | 15/315 |
| 6,058,559 A | * | 5/2000 | Yoshimi et al. | 15/328 |
| 6,213,672 B1 | * | 4/2001 | Varga | 403/109.2 |
| 6,370,730 B1 | * | 4/2002 | Young et al. | 15/327.1 |
| 6,478,342 B1 | * | 11/2002 | Berfield | 285/276 |
| 6,832,784 B1 | * | 12/2004 | Chen | 285/7 |
| 6,925,686 B2 | * | 8/2005 | Heathcock et al. | 16/429 |
| 7,293,934 B1 | * | 11/2007 | Huang | 403/109.1 |
| 2002/0053114 A1 | * | 5/2002 | Oh | 15/327.1 |
| 2004/0078925 A1 | * | 4/2004 | Evans | 15/414 |
| 2007/0039121 A1 | * | 2/2007 | Choi | 15/335 |
| 2007/0194255 A1 | * | 8/2007 | Garcia et al. | 250/504 R |

OTHER PUBLICATIONS

Definition of "groove" from dictionary.com, found at: http://dictionary.reference.com/browse/groove.*

* cited by examiner

*Primary Examiner* — Brian Glessner
*Assistant Examiner* — Brian D Mattei
(74) *Attorney, Agent, or Firm* — Philip C. Mendes da Costa; Bereskin & Parr LLP/S.E.N.C.R.L., s.r.l.

(57) ABSTRACT

A domestic appliance, such as a surface cleaning apparatus, comprises a fluid flow path including a dirt inlet and a clean air outlet with a suction motor and a treatment member provided in the fluid flow path. A first part of the surface cleaning apparatus has an opening and a second part of the surface cleaning apparatus has a key receiving portion. A key is insertable into the opening and the key receiving portion. The first part and the second part are secured together when the key is inserted.

21 Claims, 5 Drawing Sheets

CONSTRUCTION TECHNIQUE FOR A DOMESTIC APPLIANCE SUCH AS A SURFACE CLEANING APPARATUS

FIELD

The specification relates to domestic apparatuses or appliances, such as power tools, air cleaners, garden tools, pressure washers and surface cleaning apparatus, preferably to apparatuses or appliances that have a fluid flow path therein that is to be connected to another component part such as air cleaners, pressure washers and surface cleaning apparatus and in a particularly preferred embodiment to surface cleaning apparatuses. Particularly, the specification relates to domestic apparatuses or appliances that have parts that are secured together with one or more keys.

INTRODUCTION

The following is not an admission that anything discussed below is prior art or part of the common general knowledge of persons skilled in the art.

The fluid flow path and housings of known air cleaners and vacuum cleaners may consist of numerous parts, at least some of which are typically fabricated by molding two or more mating plastic members and subsequently securing the mating members together by screws or rivets. In addition, components, which may consist of a single fabricated part or an assembly of parts, may be secured to another component by screws or rivets. For example, a metal air flow conduit may be secured in position by a friction fit produced by inserting the tube into a housing and tightening the opening in the housing by means of one or more screws extending from one side of a housing to another side of a housing.

Accordingly, the mating plastic members are provided with screw ports, typically on the periphery of the mating parts. As the screws hold the mating parts together, forces applied to the part made from the mating members are unevenly distributed, and are concentrated around the screw ports. This can lead to failure of the part, for example by cracking in the vicinity of the screw port. In order to address this problem, such mating plastic members are typically provided with integral ribs, which extend around the interior of the conduit between the screw ports, and reinforce the plastic members. Further, the thickness of the part in the vicinity of the screw ports may be increased.

SUMMARY

The following summary is provided to introduce the reader to the more detailed discussion to follow. The summary is not intended to limit or define the claims.

In accordance with an aspect of this invention, components are secured together by one or more keys. The keys are inserted through an opening in a first or outer part that overlies at least a portion of a second or inner part. The key interacts with the inner part to prevent the removal of the inner part from the outer part.

For example, the outer part may surround the inner part (e.g., the inner part may be inserted into an opening in the outer part). The outer part preferably has a plurality of openings (e.g., two that are spaced apart on opposed sides of the outer part) that are sized to each receive a key. Each key extends through the outer part and engages the inner part (e.g., a gap between abutment members provided on the outer surface of the inner member or a recess in the inner part).

One advantage of this design is that the key need not extend through the wall of the inner part. If the inner part is a fluid flow conduit, then the conduit need not be pierced by a hole for receiving a screw. The keys secure the parts together by interaction of the key and the abutment members. In particular, movement of the inner part outwardly from the opening of the outer part is impeded by engagement of surface of the key and a surface of an abutment member positioned inwards of the key when the parts are assembled.

In a preferred embodiment, the abutment member is formed by a member provided on the outer surface of the inner member. Accordingly, the inner and outer parts may be secured together without providing a recess in the wall of the inner part. Accordingly, the structural integrity of the inner part is not compromised.

Alternately, or in addition, in a preferred embodiment, the abutment member or members comprise an anti-rotation mechanism. Accordingly, in addition to impeding the removal of an inner part out of an outer part, the abutment member may cooperate with the outer member to prevent relative rotation of the inner part within the outer part.

It will be appreciated that if the abutment member is formed by a member provided on the outer surface of the inner member that also forms part of an anti-rotation mechanism, then only a single key might be used.

According to one broad aspect, a surface cleaning apparatus is provided. The surface cleaning apparatus comprises a fluid flow path including a dirt inlet and a clean air outlet with a suction motor and a treatment member provided in the fluid flow path. A first part of the surface cleaning apparatus has an opening and a second part of the surface cleaning apparatus has a key receiving portion. A key is insertable into the opening and the key receiving portion. The first part and the second part are secured together when the key is inserted.

According to another broad aspect, an appliance or domestic apparatus is provided. The appliance or domestic apparatus comprises a first part positioned over a second part. The first part has an opening and the second part has a key receiving portion. A key is insertable into the opening and the key receiving portion. The parts are secured together when the key is inserted.

In any embodiment, the second part may comprise an air flow conduit and may form part of the air flow path.

In any embodiment, the second part may have an outer surface having an anti-rotation member provided thereon, and the first part may have a mating anti-rotation member. The anti-rotation member may comprise a longitudinally extending spline provided on the outer surface. The mating anti-rotation member may comprise a mating recess defined in an inner surface of the first part.

In any embodiment, the second part may comprise a wall having an outer surface and the key receiving portion may comprise a recess provided in or adjacent the outer surface. Preferably, the recess does not penetrate through the wall. The recess may comprise a discontinuity in the anti-rotation member.

In any embodiment, the first part may be positioned over the second part. The first and second parts may be adapted to be secured together by the key and an additional key. When the first part is positioned over the second part, the key and the additional key may be spaced apart around a perimeter of the first part. The key and the additional key may be positioned on opposite sides of the first part.

In any embodiment, the first and second parts may be adapted to be secured together by the key and an additional key.

DRAWINGS

Reference is made in the description to the accompanying drawings, in which.

DESCRIPTION OF VARIOUS EMBODIMENTS

Various apparatuses or methods will be described below to provide an example of each claimed invention. No example described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention.

Figure 1:
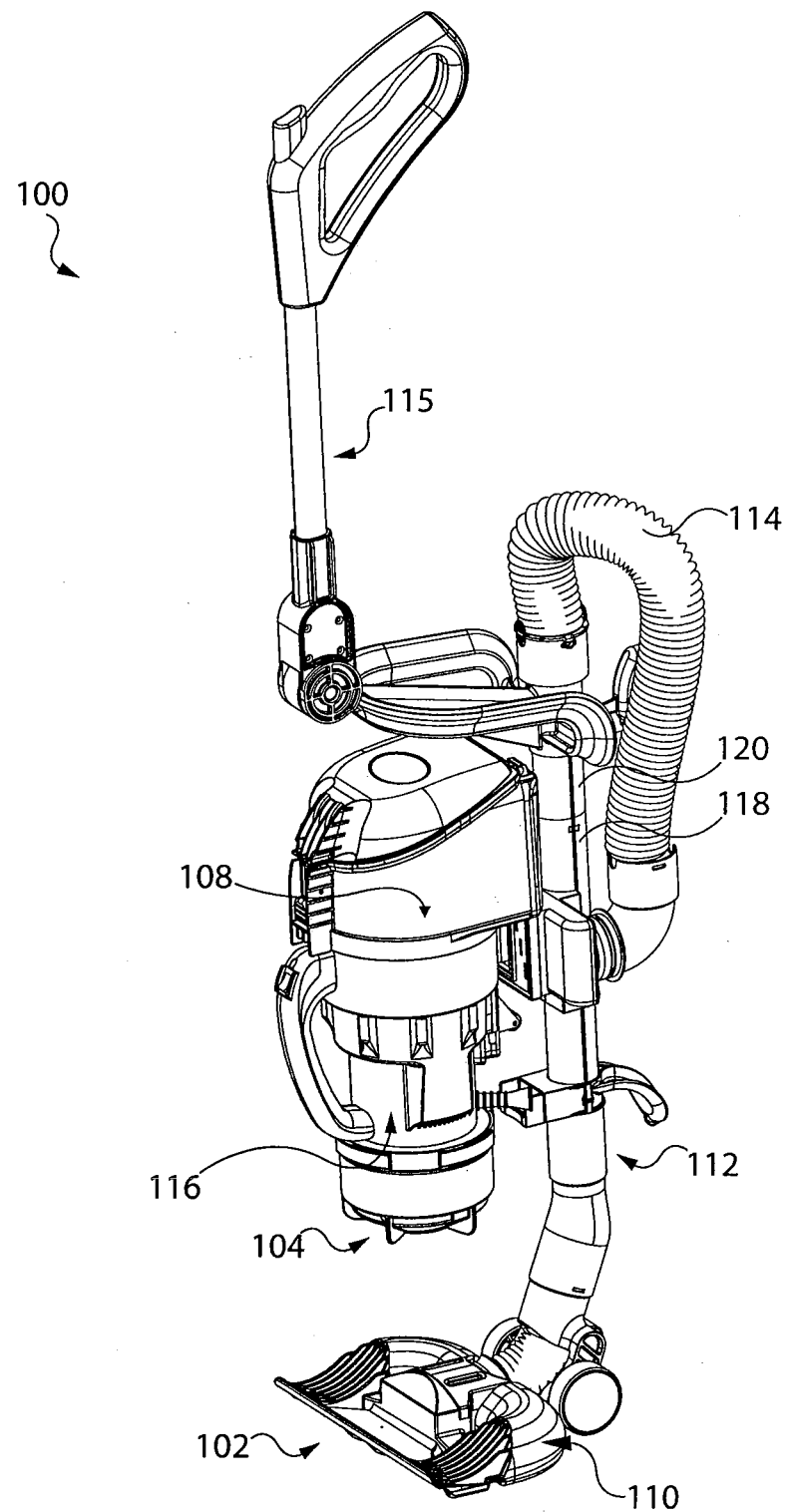
FIG. 1 is a perspective illustration of a surface cleaning apparatus comprising a first part and a second part.
Figure 2:
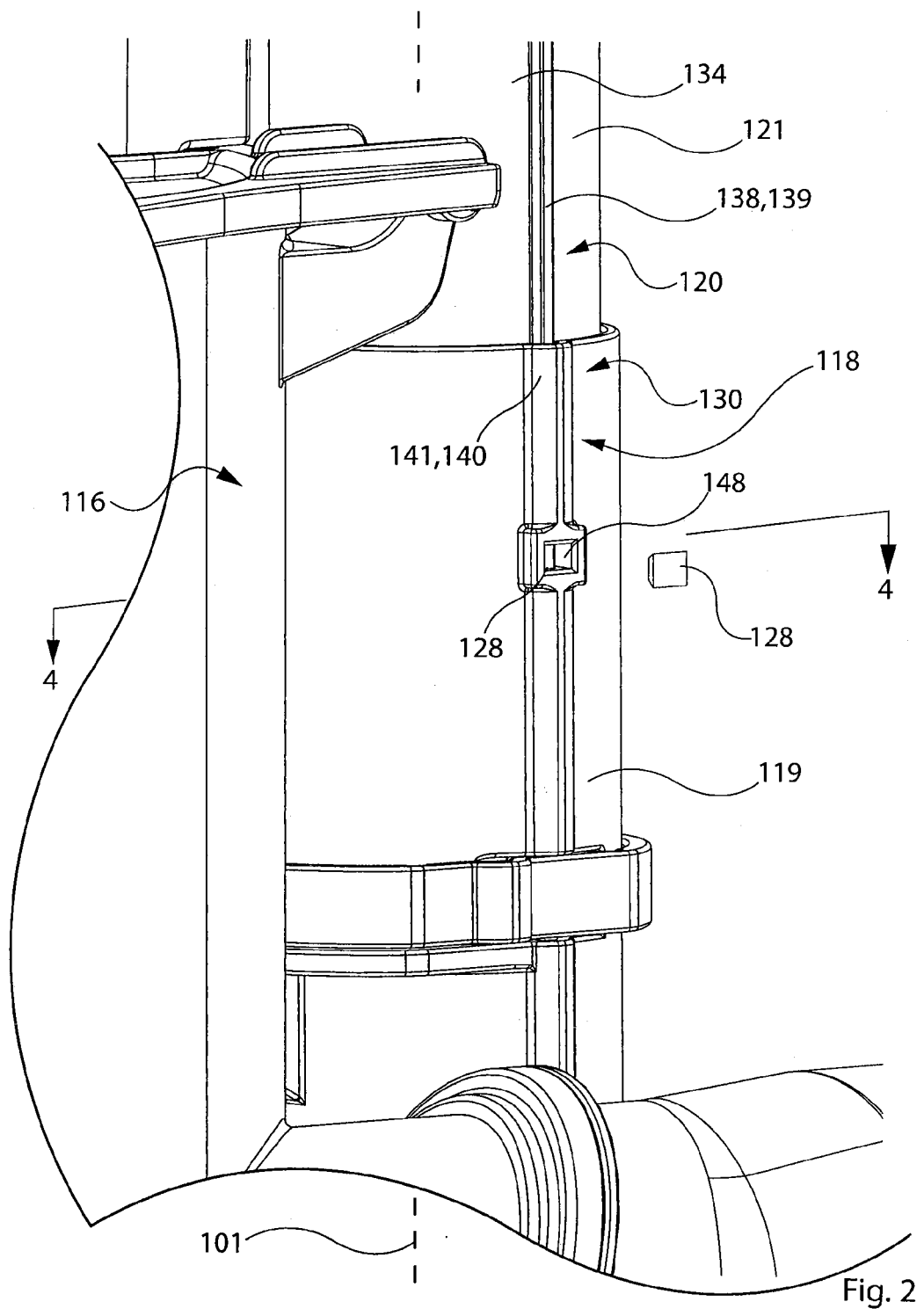
FIG. 2 is an enlarged view of the first part and second part of FIG. 1, utilized in an alternate surface cleaning apparatus.
Figure 3:
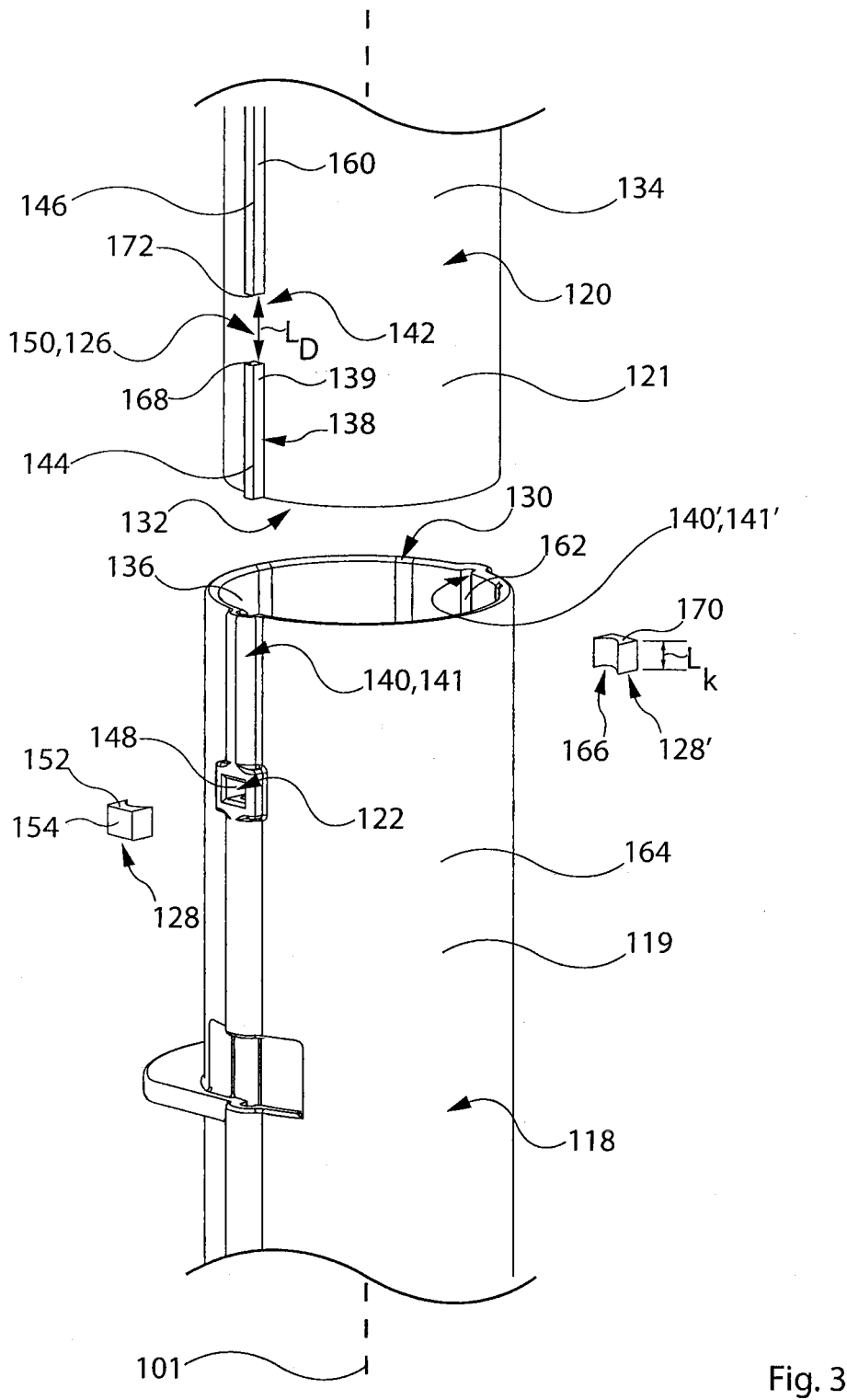
FIG. 3 is a partial exploded view of the first part and second part of FIG. 2.
Figure 4:
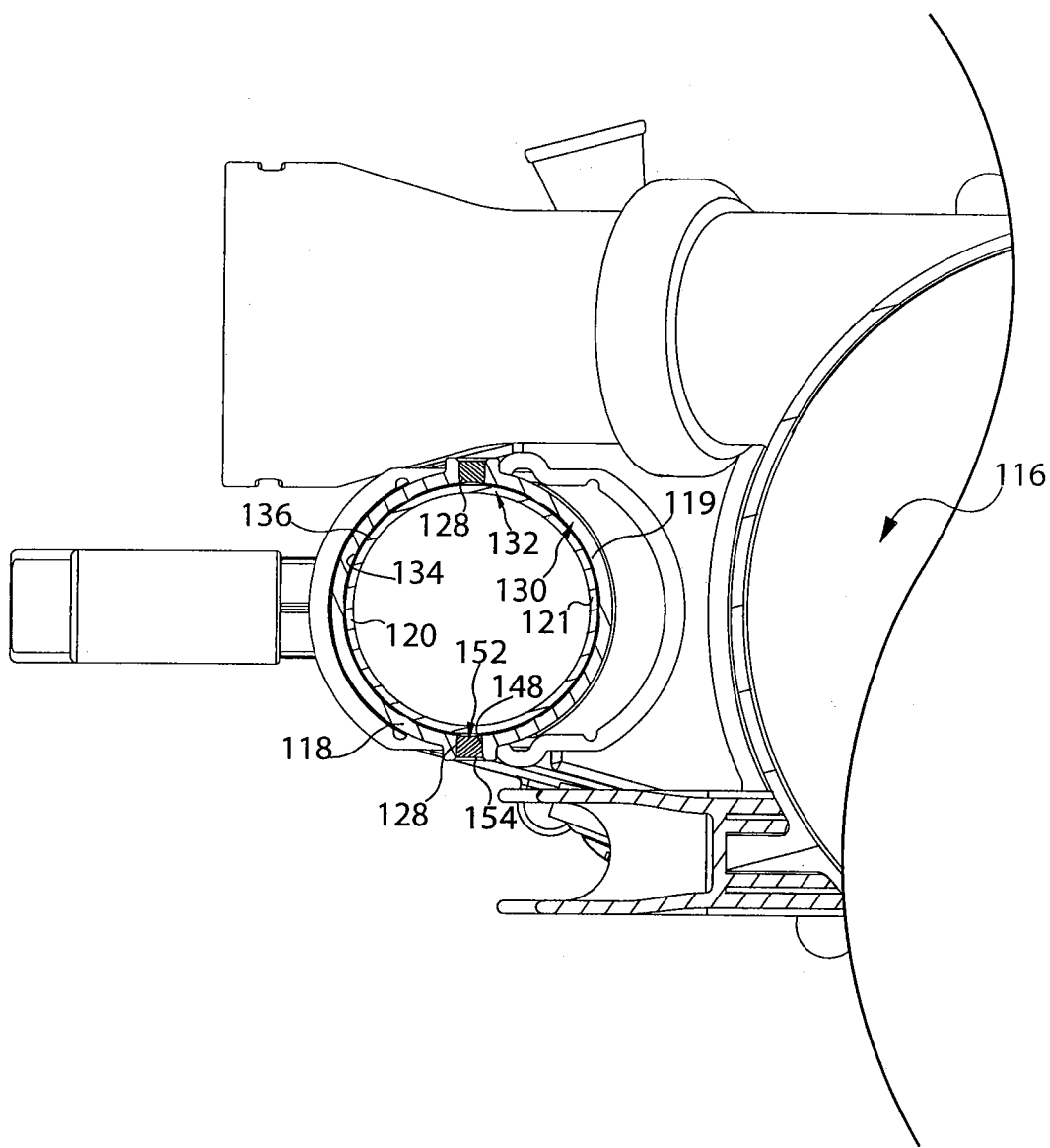
FIG. 4 is a cross section taken along line 4-4 in FIG. 2 showing two keys inserted into the first part; and, FIG. 5 is a cross section taken along line 4-4 in FIG. 2, showing the two keys removed from the first part.
Figure 5:
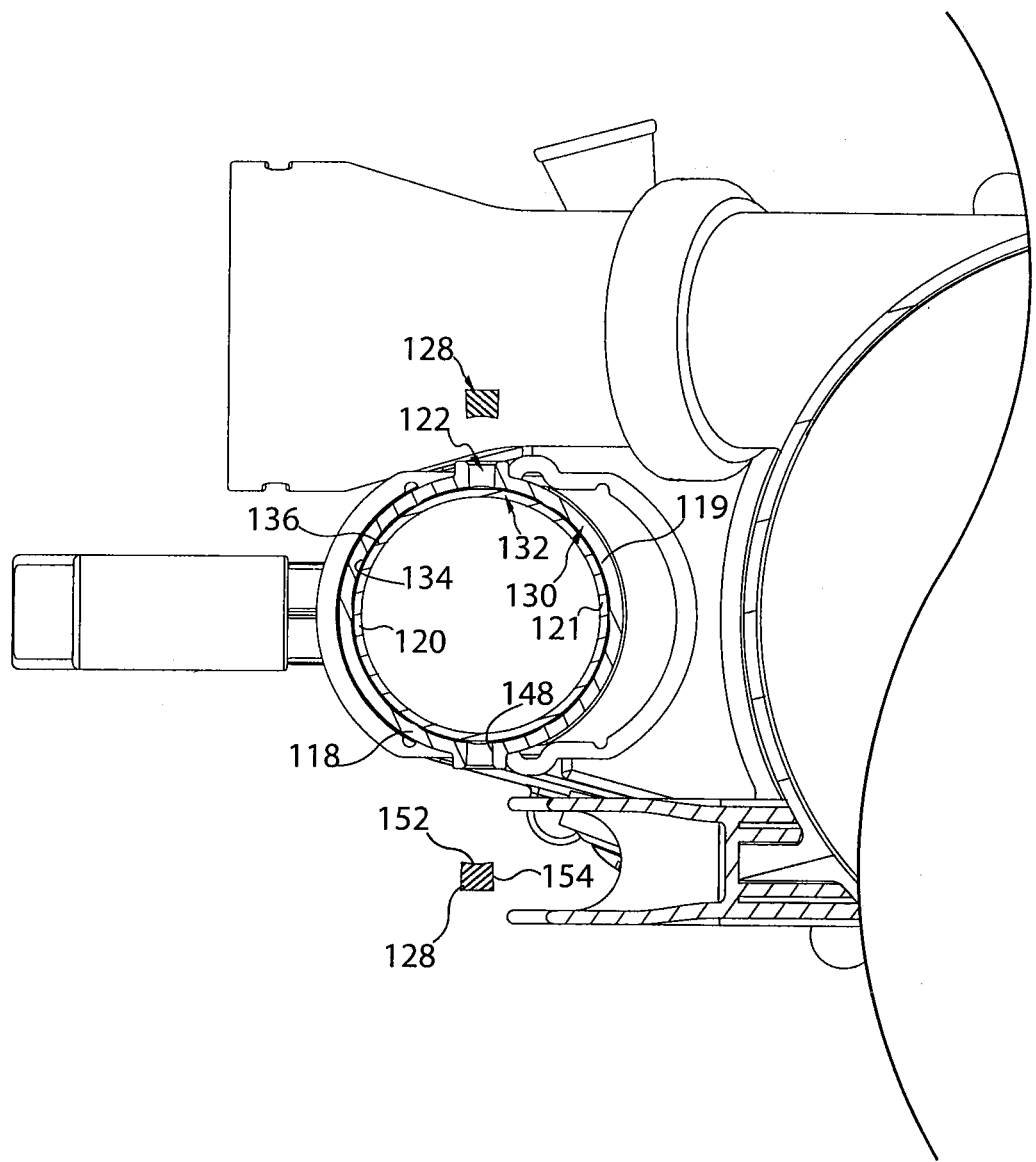

Referring to FIG. 1, a domestic apparatus 100 is shown. In the embodiment shown, the domestic apparatus 100 is a surface cleaning apparatus 100, and more particularly, an upright vacuum cleaner 100. In alternate embodiments, the surface cleaning apparatus may be, for example, a hand vacuum cleaner, a carpet extractor or cleaner, a canister type vacuum cleaner, a wet-dry vacuum cleaner, a central vacuum cleaner, or any other type of surface cleaning apparatus. In further alternate embodiments, the domestic apparatus may be, for example, a power tool, an air cleaner, a garden tool, a pressure washer, or any other type of appliance. Preferably, domestic apparatus 100 has an air flow conduit and one of the parts secured in position by a key comprises a fluid flow conduit.

Referring still to FIG. 1, in the embodiment shown, the surface cleaning apparatus 100 comprises a fluid flow path (not shown), which includes a dirt inlet 102 and a clean air outlet 104. A suction motor 106 and a treatment member 108 are provided in the fluid flow path. The treatment member may be any suitable member, which removes particulate matter from a fluid, and preferably from air, such as a filter bag, or a cyclonic cleaning unit. It will be appreciated that the dirt inlet 102, the clean air outlet 104 and the suction motor 106 may be of any design and the fluid flow path may alternately be a flow path in an apparatus without a clean air inlet or a dirty air outlet (e.g., if a fluid is recycled within the appliance).

In the embodiment shown, the dirt inlet 102 is provided in a surface cleaning head 110. An upflow duct 112 extends upwardly from the surface cleaning head, downstream of the dirt inlet 102, and is in communication with a flexible hose 114. A cleaning unit housing 116 is mounted to the upflow duct 112, and includes the suction motor 106 and the treatment member 108. The flexible hose 114 is in communication with the treatment member 108, and the suction motor 106 is downstream of and in communication with the treatment member 108. The clean air outlet 104 is downstream of the suction motor 106. A handle unit 115 is mounted to the upflow duct 112.

Referring still to FIG. 1, the surface cleaning apparatus comprises a first part 118 and a second part 120. In the embodiment shown, the first part 118 is a hollow connector into which upflow duct 112 and second part 120 are inserted. When the second part 120 is mounted in the first part 118, the second part 120 forms part of the airflow path. The first part 118 permits upflow duct 112 and the second part 120 to be in air flow communication when each is inserted into the first part 118. For example, the conduits may abut each other or face each other when inserted into the first art 118. The contact between the outer surface of the second part 120 and the inner surface of the first part 118 may define, by themselves or with a gasket or the like, a relatively tight fluid flow seal thereby preventing fluid from leaking out of the flow path. In a preferred embodiment, the use of the keys as disclosed herein is used with the portion of the fluid flow path upstream of the suction motor 106. Accordingly, if there is a leak, air will flow into the fluid flow path as opposed to a fluid leaking out of the connection. The first and second parts may have a sliding or running fit and optionally a location fit or an interference fit.

In alternate embodiments, both of the first part and the second part may not form part of the airflow path. In a further alternate example, both the first and second parts 118 and 120 may be part of the fluid flow path.

As exemplified in FIGS. 2 to 5, the first part 118 has an opening 122, and the second part 120 has a key receiving portion 126. A key 128 is insertable into the opening 122 and the key receiving portion 126. When the key 128 is inserted, the first part 118 and the second part 120 are secured together. Accordingly, if a longitudinal force is applied to the second part 120 in a direction away from the first part 118, the key will interact with the second part 120 to maintain the second part 120 in the first part 118.

By securing the first part 118 and the second part 118 together in this manner, the first part 118 and the second part 120 may be secured together relatively tightly and securely, and while still being made from a relatively thin material. Particularly, by securing the first part 118 and the second part 120 together in this manner, typical forces that are applied to the first part 118 and the second part 120 during use may be sufficiently distributed over the first part 118 and the second part 120 such that neither part need be structurally reinforced. For example, if the key 128 fits tightly into opening 122 and is dimensionally similar to opening 122, then key 122 may act as part of first part 118 to distribute loading forces applied to the key 128 across the first part 188. Accordingly, the first part 118 and the second part 120 may optionally be manufactured from a relatively thin material, without necessarily requiring thickened portions or reinforcing ribs at regions in which forces are concentrated. As such, the first part 118 and the second part 120 may optionally be relatively light in weight. Further, in embodiments wherein one or both of the first part 118 and the second part 120 form part of the airflow path, securing the first part and the second part together in this manner may still allow air to flow therethrough without providing any member that intrudes into the air flow path As exemplified, the first part 118 and the second part 120 each comprise a wall, 119, 121, respectively. The walls 119, 121 are each tubular, and extend in the direction of longitudinal axis 101. The first part 118 is positionable over the second part 120. In the preferred exemplified embodiment, the first part has an end portion 130, and the second part has an end portion 132. The end portion 132 of the second part 120 is insertable into the end portion 130 of the first part 118, so that the outer surface 134 of the second part is in facing relation with the inner surface 136 of the first part.

It will be appreciated that the parts may have any particular cross-section and need not be round. For example, if they are square, then the parts themselves will act as an anti-rotation mechanism. It will also be appreciated that the parts may be of any diameter provided that the parts are structured such that the second part 120 is positioned to interact with a key 128 inserted into an opening 122 provided in the first part 118 when the second part 120 is inserted into the first part 118. Further, the first part may have an opening extending all the way through such that first part 118 may be located at a position mid way along the length of the second part 120.

In embodiments wherein the first part and/or the second part form part of the airflow path, the end portion 132 of the second part 120 is preferably sized to be snugly and tightly received in the end portion 130 of the first part. Further, in such embodiments, a gasket, o-ring-bead, or other sealing member (not shown) may be provided between the outer surface 134 and the inner surface 136, to provide a seal in the fluid flow path.

Referring still to FIGS. 2 to 5, the second part 120 has an anti-rotation member 138, and the first part 118 has a mating anti-rotation member 140. When the first part 118 is positioned over the second part 120, the anti-rotation member 138 and the mating anti-rotation member 140 engage to prevent rotation of the second part 120 with respect to the first part 118, about axis 101.

In the exemplified embodiment, the second part 120 has an additional anti-rotation member (not shown), and the first part 118 has an additional mating anti-rotation member 140'. The additional anti-rotation member is spaced apart from the anti-rotation member 138 around the perimeter of the second part 120. For example, in the embodiment shown, the additional anti-rotation member is spaced around the perimeter from the anti-rotation member 138 by about 180°. Further, the additional mating anti-rotation member 140' is similarly spaced apart from the mating anti-rotation member 140 around the perimeter of the first part 118. For example, as shown, the additional mating anti-rotation member 140' is spaced from the mating anti-rotation member 140 by about 180°, so that it is aligned with the additional anti-rotation member.

It will be appreciated that in alternate embodiments, further additional anti-rotation members and mating anti-rotation members may be provided. For example, the second part 120 may comprise four anti-rotation members spaced about the perimeter thereof, and the first part 118 may comprise four mating anti-rotation members spaced about the perimeter thereof. Alternately, the second part 120 may comprise only one anti-rotation member, and the first part 118 may comprise only one mating anti-rotation member. If a plurality of anti-rotation members and mating anti-rotation members are provided, they may be spaced apart equally or by unequal spacing. Preferably two are used and are preferably on opposed sides, e.g., lateral sides, of the apparatus.

In the exemplified embodiment, the additional anti-rotation member is substantially identical to the anti-rotation member 138, and the additional mating anti-rotation member 140' is substantially identical to the mating anti-rotation member 140. As such, only the anti-rotation member 138 and the mating anti-rotation member 140 will be described in detail. It will be appreciated that each pair of anti-rotation member and mating anti-rotation member may be the same or different.

Referring still to FIGS. 2 to 5, in the embodiment shown, the anti-rotation member comprises a longitudinally extending spline 139 provided on the outer surface 134 of the second part 120. As exemplified, the spline 139 extends from the end portion 132 of the second part 120, generally parallel to axis 101. The spline 139 is preferably square in cross section, as shown, but may alternately be another shape, such as rounded, or triangular. The spline 139 may be of any suitable size. For example, as shown, the spline may have a length of about 2 cm to about 10 cm, and a cross sectional area of between about 1 mm² to about 1 cm².

Preferably, as shown, the spline 139 comprises a discontinuity 142. That is, as shown, the spline 139 comprises a first portion 144 proximate to the end portion 132, and a second portion 146 spaced from the first portion 144 and distal to the end portion 132. The discontinuity 142 is a gap between the first portion 144 and the second portion 146. The purpose of the discontinuity will be described in greater detail hereinbelow. The discontinuity 142 preferably has a longitudinal length $L_D$ that is approximately the same as the length $L_K$ of the key 128. It will be appreciated that if $L_D$ is substantially larger then $L_K$ then second part 120 may be longitudinally moveable within part 118 even with the key 128 inserted.

Referring still to FIGS. 2 to 5, the mating anti-rotation member 140 comprises a mating recess 141 defined in the inner surface 136 of the first part 118. As shown, the mating recess 141 extends from the end portion 130 of the first part 118, generally parallel to axis 101. The mating recess 141 is generally configured to receive the spline 139 when the second part 120 is inserted into the first part 118. When the spline 139 is received in the mating recess 141, rotation of the second part 120 with respect to the first part 118 about axis 101 is prevented, as the longitudinally extending sidewalls 160 of spline 139 will abut the longitudinally extending sidewalls of mating recess 141 to oppose any rotational forces.

It will be appreciated that, in alternate embodiments, the anti-rotation member and the mating anti-rotation member may be of any other configuration. The anti-rotation member and the mating anti-rotation member interact with each other to limit relative rotational motion between parts 118 and 120. It will be appreciated that the anti-rotation member and the mating anti-rotation member may be of any desired longitudinal length. For example, spline 139 need not extend from end 132 and recess 141 need only extend sufficiently far for part 120 to be inserted into part 118.

Referring still to FIGS. 2 to 5, as mentioned hereinabove, the first part 118 has an opening 122, and the second part 120 has a key receiving portion 126. A key 128 is insertable into the opening 122 and the key receiving portion 126 to secure the first part 118 and the second part 120 together.

In the embodiment shown, the opening 122 is defined by sidewalls 148, and extends through the wall 119 of the first part 118, preferably perpendicular to axis 101. Preferably, as shown, the opening 122 is provided through the mating recess 141. However, in alternate embodiments, for example wherein a mating recess 141 or other mating anti-rotation member 140 is not provided, the opening may not be provided through the mating recess 141.

The key-receiving portion 126 preferably comprises a recess 150 provided in or adjacent the outer surface 134 of the second part 120. For example, as shown, the recess 150 is defined by the discontinuity 142 in the spline 139. In alternate embodiments, the recess 150 may extend further inwardly into the wall 121 of the second part 120. In further alternate embodiments, the key receiving portion 126 may not be formed by the spline 139. For example, in some embodiments, a spline or other anti-rotation member may not be provided, and the key-receiving portion 126 may be a recess defined in wall 121. Preferably, as shown, the recess 126 does not penetrate through the wall 121. The key receiving portion may be any structure that prevents second part 120 being removed from first part 118 when the key 128 has been inserted into opening 122 and key receiving portion 126.

When the first part 118 is positioned over the second part 120, and the anti-rotation 138 member engages the mating anti-rotation member 140, the opening 122 is aligned with the key-receiving portion 126. That is, the position of the opening 122 about the circumference of the first part is aligned with the position of the key-receiving portion 126 about the circumference of the second part 120. In order to longitudinally align the opening 122 with the key-receiving portion 126 (i.e. in a direction parallel to axis 101), a stop or other aligning member (not shown) may be provided, so that the insertion of the second part 120 into the first part 118 is stopped when the opening 122 is aligned with the key receiving portion 126 when the second part 120 is inserted into the first part 118. Alternately, the opening 122 and the key receiving portion 126 may be aligned manually, e.g., by visual inspection or by a marking placed on, e.g., the first part 118 at a location denoting the extent of the longitudinal insertion of the first part 118 into the second part 120 to align the opening 122 and the key receiving portion 126.

They key 128 is shaped and sized to be insertable into the opening 122 and the key-receiving portion 126. For example, as shown, when the key 128 is inserted into the opening 122 and the key receiving portion 126, the distal or inner end 152 of the key is received in the discontinuity 142 in the spline 139, and the proximal or outer end 154 of the key is received in the opening 122. The key 128 may be secured in the opening 122 and the key-receiving portion 126 in any manner. For example, the key 128 may be frictionally secured in the opening 122 and the key-receiving portion 126, and/or may be glued in the opening 122 and the key-receiving portion 126. Alternately, the key 128 may be removably secured in the opening 122. For example, a removable cover may be placed over the key 128 and the opening 122 to secure the key 128 in the opening 122 or a member provided on outer end 152 to permit a user to pull key 128 out of opening 122.

Preferably, the distal end 152 of the key 128 is shaped to mate with the outer surface 134 of the second part 120. For example, as shown, the distal end 152 of the key 128 is arcuate in shape, and has a radius equal to the radius of the outer surface 134, so that the distal end 152 sits flush against the outer surface 134. Further, as shown, the key 128 is preferably shaped such that the proximal end 154 thereof is flush with or inwards of the outer surface 164 defining the entrance to the opening 122 when the key 128 is inserted into the opening 122 and the key-receiving portion 126.

When the key 128 is inserted into the opening 122 and the key-receiving portion 126, the first part 118 and the second part 120 are secured together. Specifically, if a longitudinal force is applied to remove the second part 120 from the first part 118, the distal sidewall 166 of key 128 will abut the proximal sidewall 168 of first portion 144 of spline 139 and the wall 148 of the opening 122, to oppose the force. If the opening of first part 188 does not have a stop to limit insertion of the second part 120 into the first part 118, then if a longitudinal force is applied to further insert the second part 120 into the first part 118, the proximal sidewall 170 of key 128 will abut the distal sidewall 172 of the second portion 146 of the spline 139 and the wall 148 of the opening 122, to oppose the force.

In the example shown, the key 128 is generally square in transverse cross-section, and the opening 122 is generally square. In alternate embodiments, the key 128 and the opening 122 may be of any other suitable shape. Further, it will be appreciated that the key need not extend to contact wall 121 provided it engages the anti-rotation member 138.

In the embodiment shown, an additional key 128' is provided, and the first 118 and second 120 parts are adapted to be secured together by the key 128 and the additional key 128'. Specifically, the first part comprises an additional opening 122', and the second part comprises an additional key receiving portion 126'. The additional key 128' is insertable into the additional opening 122' and the additional key receiving portion 126' to further secure the first part 118 and the second part 120 together.

In the embodiment shown, the additional key 128', additional opening 122', and additional key receiving portion 126' are substantially identical to the key 128, opening 122, and key receiving portion 126, respectively, and are therefore not described separately in detail herein.

Preferably, as shown, additional opening 122' is spaced apart from the opening 122 around the perimeter of the first part 118, and the and additional key receiving portion 126' is spaced apart from the key receiving portion 126 around the perimeter of the second part 120, so that the key 128 and the additional key 128' are spaced apart around the perimeter of the first part 118 (or the second part 120). For example, the key 128 and the additional key 128' may be on opposite sides of the first part 118.

In use, the second part 120 may be inserted into the first part 118, so that the spline(s) 138 is/are received in the mating recess(es) 140 and the key receiving portion(s) 126 is/are aligned with the opening(s) 122. The key(s) 128 may then be inserted into the opening(s) 122 and key receiving portion(s) 126, and secured therein, to secure the first part to the second part. The anti-rotation mechanism maintains the key(s) 128 in its respective key receiving recess(es) 126. Accordingly, the first and second parts 118 and 120 may not be rotated with respect to each other and the first part 118 may not be removed from the second part 120 without removing the key(s) 128.

It will be appreciated that certain features of the invention, which are, for clarity, described in the context of separate embodiments or separate aspects, may also be provided in combination in a single embodiment. Conversely, various features of the invention, which are, for brevity, described in the context of a single embodiment or aspect, may also be provided separately or in any suitable sub-combination.

Although the invention has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

The invention claimed is:

1. A surface cleaning apparatus comprising:
   (a) a fluid flow path including a dirt inlet and a clean air outlet with a suction motor and a treatment member provided in the fluid flow path;
   (b) a first part of the surface cleaning apparatus having an opening and a second part of the surface cleaning apparatus having a key receiving portion, the second part comprises an air flow conduit and forms a portion of the fluid flow path, the second part has an outer surface and an inner surface, the inner surface defining the portion of the fluid flow path, the key receiving portion having a depth and terminating prior to the inner surface; and,
   (c) a key insertable into the opening and the key receiving portion;
   (d) an anti-rotation member provided on an outer surface of the second part, and the first part having a mating anti-rotation member, wherein the opening is provided through the mating anti-rotation member, and the key receiving portion is defined by a discontinuity in the anti-rotation member whereby the first part and the second part are secured together when the key is inserted.

2. The surface cleaning apparatus of claim 1 wherein the anti-rotation member comprises a longitudinally extending spline provided on the outer surface.

3. The surface cleaning apparatus of claim 2 wherein the mating anti-rotation member comprises a mating recess defined in an inner surface of the first part.

4. The surface cleaning apparatus of claim 1 wherein the key receiving portion comprises a recess provided in or adjacent the outer surface.

5. The surface cleaning apparatus of claim 4 wherein the anti-rotation member comprises a longitudinally extending spline provided on the outer surface.

6. The surface cleaning apparatus of claim 5 wherein the mating anti-rotation member comprises a mating recess defined in an inner surface of the first part.

7. The surface cleaning apparatus of claim 5 wherein the recess comprises a discontinuity in the anti-rotation member.

8. The surface cleaning apparatus of claim 1 wherein the first part is positioned over the second part.

9. The surface cleaning apparatus of claim 1 wherein the first and second parts are adapted to be secured together by the key and an additional key.

10. The surface cleaning apparatus of claim 9 wherein the first part is positioned over the second part and the key and the additional key are spaced apart around a perimeter of the first part.

11. The surface cleaning apparatus of claim 9 wherein the first part is positioned over the second part and the key and the additional key are positioned on opposite sides of the first part.

12. An appliance or domestic apparatus comprising:
(a) a first part positioned over a second part;
(b) the first part having an opening and the second part having a key receiving portion; and,
(c) a key having an outer surface and being insertable into the opening and the key receiving portion such that the outer surface of the key terminates flush or inwards of an outer surface of the first part;
(d) an anti-rotation member provided on an outer surface of the second part, and the first part having a mating anti-rotation member;
wherein the opening is provided through the mating anti-rotation member, and the key receiving portion is defined by a discontinuity in the anti-rotation member whereby the parts are secured together when the key is inserted.

13. The appliance or domestic apparatus of claim 12 wherein the first and second parts are adapted to be secured together by the key and an additional key.

14. The appliance or domestic apparatus of claim 13 wherein the key and the additional key are spaced apart around a perimeter of the first part.

15. The appliance or domestic apparatus of claim 12 wherein the second part comprises an air flow conduit.

16. The appliance or domestic apparatus of claim 12 wherein the anti-rotation member comprises a longitudinally extending spline provided on the outer surface.

17. The appliance or domestic apparatus of claim 16 wherein the mating anti-rotation member comprises a mating recess defined in an inner surface of the first part.

18. The appliance or domestic apparatus of claim 12 wherein the second part comprises a wall defining the outer surface and the key receiving portion comprises a recess provided in or adjacent the outer surface.

19. The appliance or domestic apparatus of claim 18 wherein the recess does not penetrate through the wall.

20. The appliance or domestic apparatus of claim 18 wherein the anti-rotation member comprises a longitudinally extending spline provided on the outer surface.

21. The appliance or domestic apparatus of claim 20 wherein the mating anti-rotation member comprises a mating recess provided on an inner surface of the first part.

* * * * *